(12) United States Patent
Archambault et al.

(10) Patent No.: US 7,856,627 B2
(45) Date of Patent: Dec. 21, 2010

(54) METHOD OF SIMD-IZATION THROUGH DATA RESHAPING, PADDING, AND ALIGNMENT

(75) Inventors: Roch G. Archambault, North York (CA); Shimin Cui, Toronto (CA); Yaoqing Gao, North York (CA); Raul E. Silvera, Woodbridge (CA)

(73) Assignee: International Business Machines Corporation, Armonk, NY (US)

(*) Notice: Subject to any disclaimer, the term of this patent is extended or adjusted under 35 U.S.C. 154(b) by 1170 days.

(21) Appl. No.: 11/463,031

(22) Filed: Aug. 8, 2006

(65) Prior Publication Data

US 2008/0052693 A1 Feb. 28, 2008

(51) Int. Cl.
*G06F 9/45* (2006.01)
(52) U.S. Cl. .................. 717/151; 717/152; 717/153; 717/154; 717/155; 717/156
(58) Field of Classification Search ......... 717/151–156, 717/159, 160
See application file for complete search history.

(56) References Cited

U.S. PATENT DOCUMENTS 5,655,122 A * 8/1997 Wu ............................ 717/152
6,651,246 B1 * 11/2003 Archambault et al. ........ 717/160
6,865,661 B2 * 3/2005 Stein et al. .................... 712/15
7,000,090 B2 2/2006 Stein et al.

OTHER PUBLICATIONS

Wu, et al. "Efficient SIMD Code Generation for Runtime Alignment and Length Conversion", 2005, IEEE, p. 1-12.*
Garcia, et al. "A Novel Approach Towards Automatic Data Distribution", 1995, ACM, p. 1-25.*

* cited by examiner

*Primary Examiner*—Wei Y Zhen
*Assistant Examiner*—Qamrun Nahar
(74) *Attorney, Agent, or Firm*—Cantor Colburn LLP; Libby Toub

(57) ABSTRACT

A method for handling Simple Instruction Multiple Data (SIMD) architecture restrictions through data reshaping, padding, and alignment, including: building a global call graph; creating array descriptors for maintaining array attributes; gathering array affinity information; performing global pointer analysis and escape analysis; performing loop-based analysis to identify a SIMD opportunity; building an array affinity graph; performing graph partitioning on the array affinity graph to construct an array reshaping plan; performing data reshaping on the array affinity graph; and performing SIMDization on the array affinity graph wherein SIMDization comprises automatic generation of SIMD code.

6 Claims, 4 Drawing Sheets

```
void init() {
   a = (MA *) malloc(sizeof(MA) * N + 16);
   a.base1 = a + (a - a % 16) % 16;
   a.base2 = a.base1 + sizeof(float) * N;
   b = (MB *) malloc(sizeof(MB) * N + 16);
   b.base1 = b;
   b.base2 = b.base1 + sizeof(int) * N;
   b.base2 = b.base2 + (b.base2 - b.base2 % 16) % 16
   b.base3 = b.base2 + sizeof(float) * N;
   c = (float *) malloc(sizeof(float) * N);
   for (int i = 0 ; i < N; i++) {
     b.base2[i] = i;
     c[i]= i;
   }
}
void foo(MA *a, MB *b, float *c) {
   for (int i = 0; i < N; i++)
     a.base1[i] = b.base2[i] * c[i];
}
```

FIG. 2

```
for (int i = 0; i < 4; i++)
   a.base1[i] = b.base2[i] * c[i];
for (int i = 4; i < N - 4 – N % 4; i = i + 4)
a.base1[i] = vec_madd(b.base2[i], c[i], (vector float <4>)vec_splat_u32(0));
for (int i = N - 4 – N % 4; i < N; i++)
   a.base1[i] = b.base2[i] * c[i];
```

FIG. 3

```
void foo(MA *a, MB *b, float *c) {
   for (int i = 0; i < N – N % 4; i = i + 4)
     a.base1[i] = vec_madd(b.base2[i], c[i], (vector float <4>)vec_splat_u32(0));
   for (int i = N – N % 4; i < N; i++)
     a.base1[i] = b.base2[i] * c[i];
}
```

FIG. 4

METHOD OF SIMD-IZATION THROUGH DATA RESHAPING, PADDING, AND ALIGNMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to Single Instruction Multiple Data (SIMD) technology, and particularly to a method for handling SIMD architecture restrictions through data reshaping, padding, and alignment.

2. Description of Background

Single Instruction Multiple Data (SIMD) is a set of special operations supported by various processors to perform a single operation on several numbers simultaneously. SIMD support enables compilers to exploit fine-grained parallelism by vectorizing loops that perform a single operation on multiple elements in a data set. Although vectorization has been studied for traditional vector processors, there are several challenges for effectively exploiting SIMDization due to the more restricitive SIMD architectures. The SIMD vectorization (a.k.a. SIMDization) is implemented in IBM's XL product compiler, and thus supports multiple programming languages (e.g., C, C++, and Fortran), and multiple target machines (e.g., SPU, VMX, and BG/L).

Many SIMD units support loads and stores from vector-length aligned memory only and memory access is in a contiguous chunk of vector-length bytes.

There are several issues related to automatic generation of SIMD code (referred to as SIMDization). These issues are listed below.

A first issue concerns alignment. In other words, accessing a block of memory from a location, which is not aligned on a natural vector-size boundary, is often prohibited or bears a heavy performance penalty. To handle the alignment problem, techniques like loop peeling, loop versioning, and static and dynamic alignment detection are typically used.

A second issue concerns out-of-boundary memory access and false sharing. For instance, vector load and store in the first and last few iterations in a loop could access memory out of its boundary although the loop only operates the memory locations within its own boundary. This causes a memory violation, e.g., memory accesses beyond a memory segment are required to generate a memory violation. Also it causes non-deterministic behaviors on multiple threading environments. One way of typically handling this issue is by adding a prologue and epilogue loop to check the boundary, and process the first and last few iterations.

A third issue concerns contiguous memory accesses with vector-length bytes. In other words, a load or store instruction loads or stores a 16-byte aligned memory, ignoring the last 4 bits of the memory address in the instruction. A fourth issue invloves isomorphic statements. For instance, for an array, a loop is SIMDized since statements in the loop are isomorphic and operate on all fields of a structure. However, when there is a mixture of operations, the loop cannot be SIMDized.

Considering the limitations of the aforementioned methods, it is clear that there is a need for an efficient method for handling SIMD architecture restrictions through data reshaping, padding, and alignment.

SUMMARY OF THE INVENTION

The shortcomings of the prior art are overcome and additional advantages are provided through the provision of a method for handling Simple Instruction Multiple Data (SIMD) architecture restrictions through data reshaping, padding, and alignment, the method comprising: building a global call graph; creating array descriptors for maintaining array attributes; gathering array affinity information; performing global pointer analysis and escape analysis; performing loop-based analysis to identify a SIMD opportunity; building an array affinity graph; performing graph partitioning on the array affinity graph to construct an array reshaping plan; performing data reshaping on the array affinity graph; and performing SIMDization on the array affinity graph wherein SIMDization comprises automatic generation of SIMD code.

The shortcomings of the prior art are overcome and additional advantages are provided through the provision of a system for handling Simple Instruction Multiple Data (SIMD) architecture restrictions through data reshaping, padding, and alignment, the system comprising: a network; and a host system in communication with the network, the host system including software to implement a method comprising: building a global call graph; creating array descriptors for maintaining array attributes; gathering array affinity information; performing global pointer analysis and escape analysis; performing loop-based analysis to identify a SIMD opportunity; building an array affinity graph; performing graph partitioning on the array affinity graph to construct an array reshaping plan; performing data reshaping on the array affinity graph; and performing SIMDization on the array affinity graph wherein SIMDization comprises automatic generation of SIMD code.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for an efficient method for handling SIMD architecture restrictions through data reshaping, padding, and alignment.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of resulting code of data reshaping according to the exemplary embodiments of the present invention;

FIG. 3 illustrates one example of a loop in a foo( ) function after reshaping according to the exemplary embodiments of the present invention; and FIG. 4 illustrates one example of a loop in a foo( ) function after further reshaping according to the exemplary embodiments of the present invention.

DETAILED DESCRIPTION OF THE INVENTION

Figure 1:
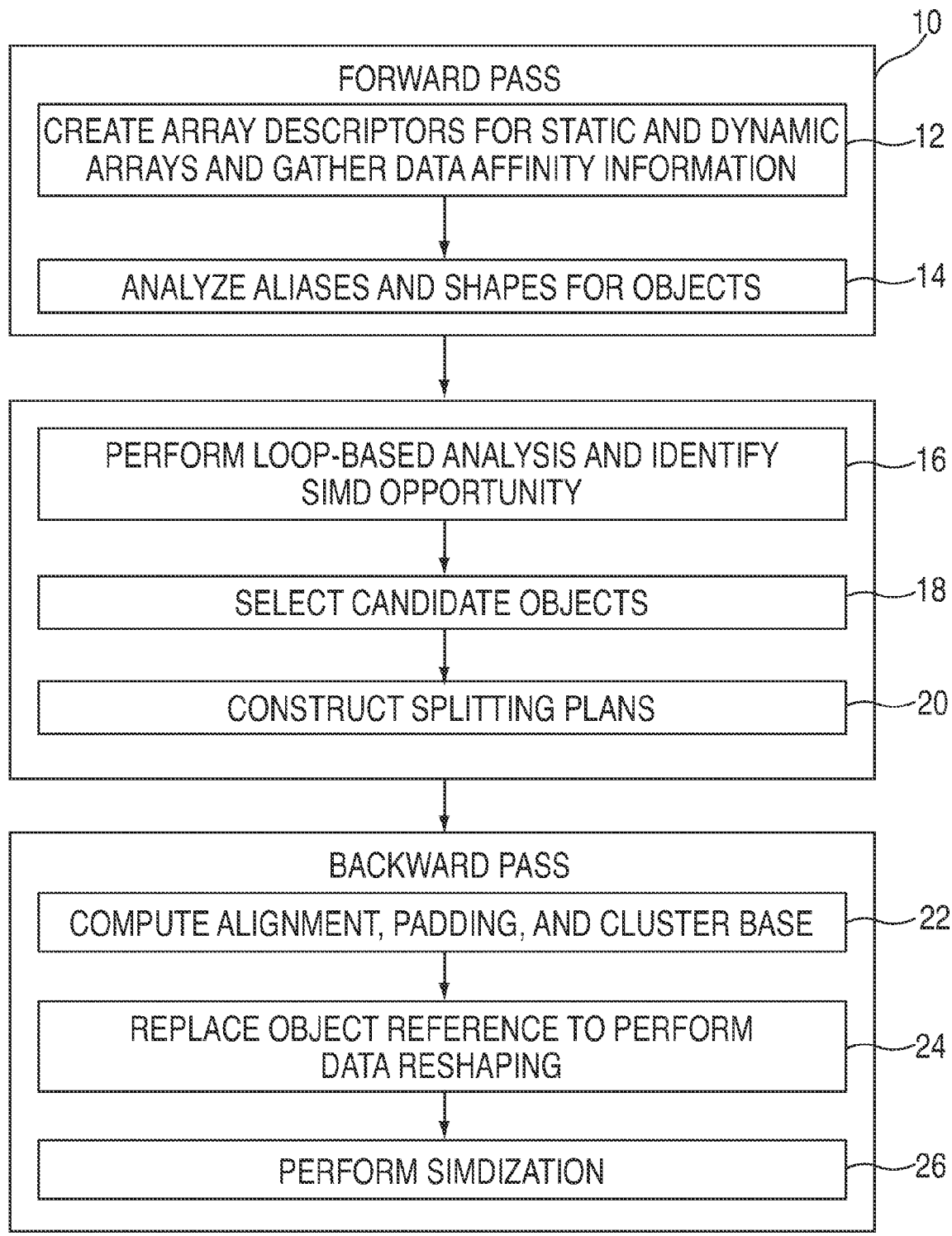
FIG. 1 illustrates one example of a flowchart for SIMDization through data reshaping, padding, and alignment according to the exemplary embodiments of the present invention.

One aspect of the exemplary embodiments is a method for handling SIMD architecture restrictions through data reshaping, padding, and alignment.

The exemplary embodiments provide a method and framework to exploit SIMD effectively in order to handle SIMD architecture restrictions through data reshaping, padding, and alignment. This is accomplished by (1) data splitting for stride-one access, (2) alignment handling through array padding and global propagation to avoid unnecessary loop peeling and versioning, and (3) array grouping and array padding to eliminate the prologue and epilogue loops for out-of-boundary segment violation and false sharing. Furthermore, an optimizing compiler is used to determine whether data reshaping may be carried out for SIMDization.

A data structure referred to as "object descriptor list" is generated in the SIMD system. The data structure is used to keep track of pointers, which may be eligible as candidate or target pointers in a program. Each entry in the object descriptor list holds at least the following attributes corresponding to a pointer: (1) the pointer alias set, which is the equivalent symbols of address type, (2) a list of points-to sets, where each points-to set contains all the points-to symbols of the equivalent pointers for an element with the same length and offset. It also contains the cluster ID, which is the element offset in the cluster if this object is a candidate, (3) the access pattern, where the patterns are in a pointer, array, or inconsistent form. If it's an array access, the information for its dimension and stride is recorded, (4) the memory allocation site information, which includes allocation type (statically and dynamically allocated) and memory size. The call graph edge for the call site is used as a hash key to locate the allocation site information, (5) SIMD information indicating if there are any SIMDization opportunities and relative alignments, and (6) a list of splitting cluster information, which includes cluster length, cluster offset, and cluster base address.

For every array, whether the array is a dynamic array or a static array, there is a corresponding data structure, called an array descriptor, which maintains array attributes such as, lower bound, upper bound, dimension, stride, etc. An array descriptor is accessed through its array descriptor index. Also, there is an affinity matrix, referenced by the array descriptor index for recording the information about how high frequency affinity[i,j] is to be accessed for arrays with array descriptor indexes i, and j, respectively.

In addition, the SIMD system traverses each node in a call graph in an intermediate representation of the code being compiled in reverse depth-first order (top-down). If the intermediate representation for a procedure is not available, then the procedure is identified as an undefined procedure (for example, assembler code being linked to the compiled code), otherwise the procedure is a defined procedure. For each defined procedure reached in the top-down traversal of the call graph, the SIMD system collects the pointer information and records the information in the object descriptor list. This candidate list is refined during traversal of the call-graph, and is finalized at the end of the traversal.

An object descriptor is created for a symbol of address type, which can be a pointer or a function that returns an address, excluding a memory allocation function.

In a first instance, for the case of store operation of a pointer, if it comes from a memory allocation, the memory allocation information is added to the descriptor. Otherwise, the descriptor for the left-hand side of pointer and the descriptor for the right-hand side pointer of are combined and it is said they are equivalent pointers.

In a second instance, for a pointer de-reference, the reference pattern and points-to information are recorded for the pointer. The points-to information is classified according to the field length and offset. If any two of the points-to are incompatible, the pointer is considered to be an invalid candidate. Two arrays are considered to be compatible if and only if (a) the element types are compatible, (b) they have the same dimension, and (c) the corresponding dimensions have the same strides. Two aggregates are considered compatible if and only if (a) they have the same number of fields and (b) the corresponding fields have the same length and offset.

In a third instance, if a pointer is passed as a parameter to a known procedure (which could include both defined procedures and known library functions), the object descriptor for the pointer and the object descriptor for the formal parameter is merged. If a pointer is passed as a parameter to an unknown procedure, the pointer is considered to be an invalid candidate.

When the entire intermediate representation of the code to be compiled has been traversed, the object descriptor list contains data representing all potential candidates of pointers for optimization of the data reshaping. The object descriptor list can also be used to refine alias information.

In the exemplary embodiments of the present invention, the object descriptor list for a sample program contains entries:

[0] Aliases (ids=a), points-to ((length=4,offset=0,ids= a[ ].ax, cluster=0), (length=4,4,ids=a[ ].ay, cluster=0)), Access (array, dimension=1,stride=8), Allocation (edge=1), SMID (alignment), cluster ( )

[1] Aliases (ids=b), points-to ((length=4, offset=0,ids= b[ ].bx, cluster=0), (length=4, offset=4,ids=b[ ].by, cluster=0), (length=4,8,b[ ].bz,0)), Access (array, dimension=1,stride=12), Allocation (edge=2), SMID (alignment), cluster ( )

[2] Aliases (ids=c), points-to (c[ ]), Access (array, dimension=1, stride=4), Allocation (edge=3), SMID (alignment), cluster ( )

For each dynamic object, the object descriptor records the details of points-to, and SIMD information gathered. The object list for the sample program contains entries for symbols a, b, and c. For object "a", there are two field points-to sets, in which the field a[ ].ax is a SIMD candidate. For object "b", there are three field points-to sets, in which the field b[ ].by is a SIMD candidate. Object "c" only contains one points-to symbol c[ ], which implies that it is not required to split. In addition, the affinity information is gathered for arrays. The loop based analysis through static and dynamic profile information is used to calculate the affinity for each pair of arrays.

After the object descriptor list is built, the system analyzes the list to select the candidate for data reshaping based on the data shape analysis. For each object descriptor, the system analyzes its access pattern, its allocation information and its points-to sets to decide the candidacy of the pointer and its points-to and update the object descriptor. The pointer is considered as a candidate if (1) the shapes of all of its points-to members are compatible in the whole program, (2) the access pattern is consistent, and (3) there is a profitable SIMDization opportunity.

Once an object is determined to be a candidate, the system constructs a reshaping plan for the aggregated data structure of the elements of the object. An affinity graph is built to guide data reshaping. With the data-reshaping plan, the object is reshaped into two or more clusters, with each cluster contains at least one element. For each cluster, a global symbol is generated to record the base address of the cluster. For dynamic objects, the value of the cluster base address is to be set at the allocation site. The cluster information is recorded into the object descriptor.

The object descriptor list for the sample program now looks like:

[0] Aliases (ids=a), points-to ((length=4,offset=0,id= a[ ].ax, cluster=1), (length=4,offset=4,id=a[ ].ay, cluster=2)), Access (array, dimension=1, stride=8), Allocation (edge=1), SMID (alignment), cluster ((id=1, length=4,offset=0,base=a.base1), (id=2,length=4, offset=4,base=a.base2))

[1] Aliases (ids=b), points-to ((length=4,offset=0,id= b[ ].bx, cluster=1), (length=4,offset=4,id=b[ ].by, cluster=2), (length=4,offset=8,b[ ].bz, cluster=3)), Access (array, dimension=1, stride=12), Allocation (edge=2), SMID (alignment), cluster ((id=1,length=4,offset=0, base=b.base1), (id=2,length=4,offset=4,base=b.base2), (id=1,length=4,offset=0,base=b.base3))

[2] Aliases (ids=c), points-to (c[ ]), Access (array, dimension=1, stride=4), Allocation (edge=3), SMID (alignment), cluster ( )

The objects "a" and "b" are determined to be data reshaping candidates for SIMDization. There are two clusters for object "a". The corresponding cluster base addresses are "a.base1" and "a.base2". There can be two or three clusters for object "b". The example shows three clusters and the corresponding cluster base addresses are "b.base1", "b.base2", and "b.base3". Once all object descriptors are examined, the system modifies the intermediate representation of the code being compiled. As may be seen from the above description, this step is well suited for inclusion in a backward pass in an inter-procedural optimizer of a compiler, in which the system traverses the call graph in the depth-first order (bottom-up).

For each allocation site of a candidate dynamic object, a store operation to each cluster base address is inserted. If a cluster is a SIMD candidate, the base address computation considers the SIMD alignment and padding: (1) for the first cluster, the padding is required to make sure its alignment satisfy the SIMD requirement. The computation is based on the object address, (2) for the non-first cluster, the alignment should be set to satisfy the SIMD requirement. If the alignment is bigger than that of the previous cluster, padding may be required. The computation is based on the sizes and padding of previous clusters.

With respect to the sample program, since cluster 1 of "a" is SIMD candidate, the padding in added to ensure the SIMD alignment when its base address a.base1 is computed. Also, since the cluster 2 of object "b" is SIMD candidate, the padding in added to ensure the SIMD alignment when its base address b.base2 is computed. For all the references of pointers in the pointer alias set of a candidate object, the code is transformed to reflect the shape of the splitting object in terms of the cluster base.

Referring to FIG. 1, one example of a flowchart for SIMDization 10 through data reshaping, padding, and alignment according to the exemplary embodiments of the present invention is illustrated. The SIMDization flowchart 10 starts at step 12 where array descriptors are created for static and dynamic arrays and data affinity information is gathered. In step 14, the aliases and the shapes of the objects are analyzed. In step 16, loop-based analysis is performed and a SIMD opportunity is identified. In step 18, candidate objects are selected. In step 20, splitting plans are constructed. In step 22, alignment, padding, and cluster base is computed. In step 24, the object reference is replaced in order to perform data reshaping. In step 26, SIMDization is performed.

Referring to FIG. 2, one example of resulting code 30 of data reshaping according to the exemplary embodiments of the present invention is illustrated.

Referring to FIG. 3, one example of a loop in a foo( ) function 32 after reshaping according to the exemplary embodiments of the present invention is illustrated. The loop in foo( ) in the sample program is SIMDized as shown in FIG. 3. During data reshaping for arrays with SIMDization opportunities, data are aligned with natural vector-size boundary through data padding as mentioned above and the alignment information is recorded in the loop table, a list of loop descriptors, which contain loop attributes. The global alignment analysis is performed and propagated to avoid unnecessary loop versioning and peeling.

Referring to FIG. 4, one example of a loop in a foo( ) function 34 after further reshaping according to the exemplary embodiments of the present invention is illustrated. The loop in foo( ) in the sample program is SIMDized as shown in FIG. 3 in a simpler manner after data alignment and propagation are performed.

Besides array padding for alignment, array padding could be incorporated with data reshaping to handle the issue out-of-boundary memory access and false sharing. Array affinity information can inform a user how often arrays are accessed together. There is no worry if there is enough data space around arrays to be SIMDized. Also there is no problem with false sharing in multiple threading mode, if the data around arrays are never accessed together with the arrays through array affinity information. In other words, when there are arrays u, v, and w, and v is the array to be SIMDized in a loop, there is no problem with memory segment and false sharing problems if u, v and w are grouped together as {u, v, w}, and v and w are not accessed together with v in any case through array affinity analysis.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for handling Simple Instruction Multiple Data (SIMD) architecture restrictions through data reshaping, padding, and alignment, the method comprising:
    building a global call graph having a plurality of nodes for a plurality of procedures;
    traversing each of the plurality of nodes in the global call graph in an intermediate representation in reverse depth-first order, wherein in response to the intermediate representation not being available for a procedure from the plurality of procedures, identifying the procedure as undefined, and in response to the intermediate representation being available defining the procedure as defined;
    for each procedure of the plurality of procedures being defined, collecting and recording pointer information;
    creating array descriptors for maintaining array attributes;
    gathering array affinity information;
    performing global pointer analysis and escape analysis;
    performing loop-based analysis to identify a SIMD opportunity;
    building an array affinity graph;
    performing graph partitioning on the array affinity graph to construct an array reshaping plan;
    performing data reshaping on the array affinity graph; and
    performing SIMDization on the array affinity graph wherein SIMDization comprises automatic generation of SIMD code, wherein the array descriptors are accessed by an array descriptor index,
    wherein an affinity matrix is referenced by the array descriptor index,
    wherein for every array in the array affinity graph, whether the array is a dynamic array or a static array, an array descriptor index that is accessed through its array descriptor index, maintains array attributes including, lower bound, upper bound, dimension, stride.

2. The method of claim 1, further comprising the step of generating an object descriptor for keeping track of pointers.

3. The method of claim 2, wherein each entry in the object descriptor includes a pointer alias set, a list of points-to sets, an access pattern, memory allocation information, SIMD information, and a list of splitting cluster information.

4. A system for handling Simple Instruction Multiple Data (SIMD) architecture restrictions through data reshaping, padding, and alignment, the system comprising:
    a network; and
    a host system having a processor in communication with the network, the host system including instructions for the processor to implement a method comprising:
        building a global call graph having a plurality of nodes for a plurality of procedures;
    traversing each of the plurality of nodes in the global call graph in an intermediate representation in reverse depth-first order, wherein in response to the intermediate representation not being available for a procedure from the plurality of procedures, identifying the procedure as undefined, and in response to the intermediate representation being available defining the procedure as defined;
    for each procedure of the plurality of procedures being defined, collecting and recording pointer information;
    creating array descriptors for maintaining array attributes;
    gathering array affinity information;
    performing global pointer analysis and escape analysis;
    performing loop-based analysis to identify a SIMD opportunity;
    building an array affinity graph;
    performing graph partitioning on the array affinity graph to construct an array reshaping plan;
    performing data reshaping on the array affinity graph; and
    performing SIMDization on the array affinity graph wherein SIMDization comprises automatic generation of SIMD code, wherein the array descriptors are accessed by an array descriptor index,
    wherein an affinity matrix is referenced by the array descriptor index,
    wherein for every array inn the array affinity graph, whether the array is a dynamic array or a static array, an array descriptor index that is accessed through the array descriptor index, maintains array attributes including, lower bound, upper bound, dimension, stride.

5. The system of claim 4, further comprising the step of generating an object descriptor for keeping track of pointers.

6. The system of claim 5, wherein each entry in the object descriptor includes a pointer alias set, a list of points-to sets, an access pattern, memory allocation information, SIMD information, and a list of splitting cluster information.

* * * * *